United States Patent
Laukkanen

(10) Patent No.: US 9,832,675 B2
(45) Date of Patent: Nov. 28, 2017

(54) SYSTEM AND METHOD FOR INTERFERENCE DETECTION

(71) Applicant: Keysight Technologies Singapore (Holdings) Pte Ltd, Minneapolis, MN (US)

(72) Inventor: Juha Laukkanen, Kempele (FI)

(73) Assignee: Keysight Technologies Signapore (Holdings) Pte Ltd, Wilkie Edge (SG)

( * ) Notice: Subject to any disclaimer, the term of this patent is extended or adjusted under 35 U.S.C. 154(b) by 106 days.

(21) Appl. No.: 14/865,739

(22) Filed: Sep. 25, 2015

(65) Prior Publication Data
US 2016/0095012 A1    Mar. 31, 2016

(30) Foreign Application Priority Data
Sep. 29, 2014   (EP) ..................................... 14186809

(51) Int. Cl.
| | |
|---|---|
| H04L 12/26 | (2006.01) |
| H04W 24/10 | (2009.01) |
| H04W 16/14 | (2009.01) |
| H04L 5/00 | (2006.01) |

(52) U.S. Cl.
CPC ............. *H04W 24/10* (2013.01); *H04L 5/006* (2013.01); *H04W 16/14* (2013.01)

(58) Field of Classification Search
CPC ........ H04W 24/10; H04W 16/14; H04L 5/006
See application file for complete search history.

(56) References Cited

U.S. PATENT DOCUMENTS

| | | | |
|---|---|---|---|
| 6,771,968 B1 | 8/2004 | Heubel | |
| 2011/0090939 A1* | 4/2011 | Diener | ................. H04L 1/0001 |
| | | | 375/136 |
| 2011/0110255 A1* | 5/2011 | Park | ..................... H04B 17/382 |
| | | | 370/252 |

FOREIGN PATENT DOCUMENTS

| | | |
|---|---|---|
| GB | 2422968 A | 9/2006 |
| WO | 2006051509 A1 | 5/2006 |
| WO | 2013123638 A1 | 8/2013 |
| WO | 2014152816 A2 | 9/2014 |

OTHER PUBLICATIONS

EP Search Report for Application No. 14186809.1-1870 dated Mar. 23, 2015.

* cited by examiner

*Primary Examiner* — Afshawn Towfighi

(57) ABSTRACT

Solutions for interference detection are provided. A frequency band is scanned (200) for transmissions of a transmission system. One or more parameters are determined (202) from the obtained scanning results. At least one determined parameter is compared (204) to a threshold value. On the basis of the comparison it is determined (206) that an unknown transmission exists on a given frequency band. One or more transmission systems are determined (208) which may be the cause of the unknown transmission. At least part of the given frequency band is scanned (210) for transmissions of the determined one or more transmission system; and on the basis of the scanning the system causing the unknown transmission is determined. Information related to the system and transmission parameters of the unknown transmission are decoded (212).

17 Claims, 3 Drawing Sheets

SYSTEM AND METHOD FOR INTERFERENCE DETECTION

RELATED AND CO-PENDING APPLICATIONS

This application claims priority benefit of corresponding European patent application number 14186809.1 filed on 29 Sep. 2014 the entirety of which is hereby incorporated by reference in its entirety.

FIELD

The exemplary and non-limiting embodiments of the invention relate generally to wireless communication systems. Embodiments of the invention relate especially to apparatuses, methods, and computer program products in detecting interference in wireless communication systems.

BACKGROUND

The use of wireless systems in communication is continuously increasing. In some cases, wireless communication is replacing wired communication networks because the technology has advanced such that wireless communication systems can offer service quality equal to or exceeding the quality of wired networks.

The increased use and number of wireless systems have introduced some problems. In general, wireless systems and base stations of the systems are designed for maximum sensitivity rather than selectivity. This is one cause of degradation in the overall performance of wireless systems.

Standards committees and national regulatory bodies (such as the FCC in the US) provide system specification framework for interoperability of different air interfaces allocated in different frequencies worldwide. However, all possible interference scenarios cannot be accounted for, and as more of the global population migrates to mobile wireless networks each user will contribute more to the interference background, bringing the presence and management of interference to the fore. In wireless communication systems, interference can have a significant effect on the expected performance. Especially out-of-band interference is a problem in growing wireless networks.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus, comprising: at least one processor; and at least one memory including computer program code, the at least one memory and the computer program code configured to, with the at least one processor, cause the apparatus at least to perform: scan a given frequency band for transmissions of a given transmission system; determine one or more given parameters from the obtained scanning results; compare at least one determined parameter to a given threshold value; determine on the basis of the comparison that an unknown transmission exists on a given frequency band; determine one or more transmission systems which may be the cause of the unknown transmission; scan at least part of the given frequency band for transmissions of the determined one or more transmission system; and determine on the basis of the scanning the system causing the unknown transmission and decoding information related to the system and transmission parameters of the unknown transmission.

According to an aspect of the present invention, there is provided a method, comprising: scanning a given frequency band for transmissions of a given transmission system; determining one or more given parameters from the obtained scanning results; comparing at least one determined parameter to a given threshold value; determining on the basis of the comparison that an unknown transmission exists on a given frequency band; determining one or more transmission systems which may be the cause of the unknown transmission; scanning at least part of the given frequency band for transmissions of the determined one or more transmission system; and determining on the basis of the scanning the system causing the unknown transmission and decoding information related to the system and transmission parameters of the unknown transmission.

BRIEF DESCRIPTION OF THE DRAWINGS

Embodiments of the present invention are described below, by way of example only, with reference to the accompanying drawings, in which.

DETAILED DESCRIPTION

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain also features, structures, units, modules etc. that have not been specifically mentioned.

Many different radio protocols or access methods to be used in communications systems exist and are under development. Some examples of different access methods or communication systems are the universal mobile telecommunications system (UMTS) radio access network (UTRAN or E-UTRAN), long term evolution (LTE®, known also as E-UTRA), long term evolution advanced (LTE-A®), Enhanced Voice-Data Optimized or Enhanced Voice-Data Only (Ev-DO, EVDO), Code Division Multiple Access (CDMA), Wideband Code Division Multiple Access (WCDMA), Global System for Mobile Communications (GSM), Terrestrial Trunked Radio (TETRA), Wireless Local Area Network (WLAN, WiFi) based on IEEE 802.11 standard, Worldwide interoperability for microwave access (Wi- MAX), Bluetooth®, personal communications services (PCS) and systems using ultra-wideband (UWB) technology. IEEE refers to the Institute of Electrical and Electronics Engineers. LTE and LTE-A are developed by the Third Generation Partnership Project 3GPP.

Embodiments are applicable to any communication system or any combination of different communication systems that support required functionalities.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

Figure 1A:
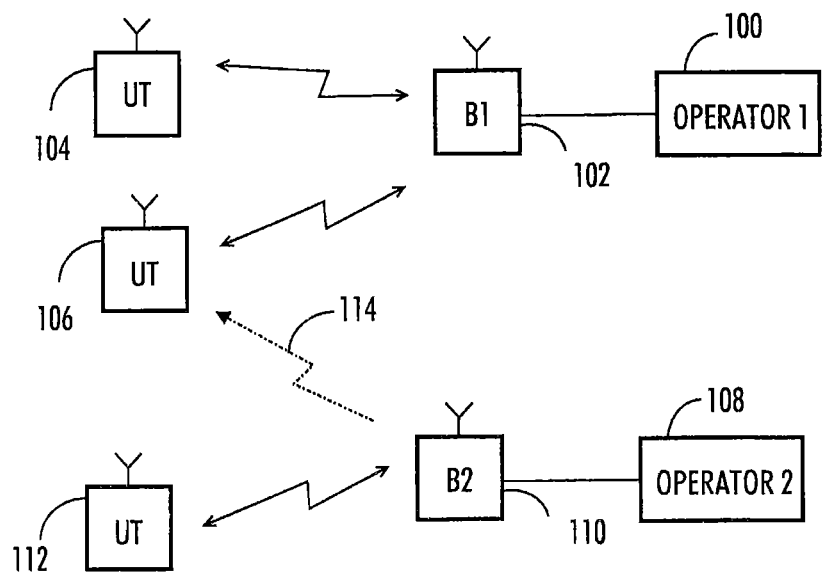
FIGS. 1A and 1B illustrate simplified views of communication environments.
Figure 1B:
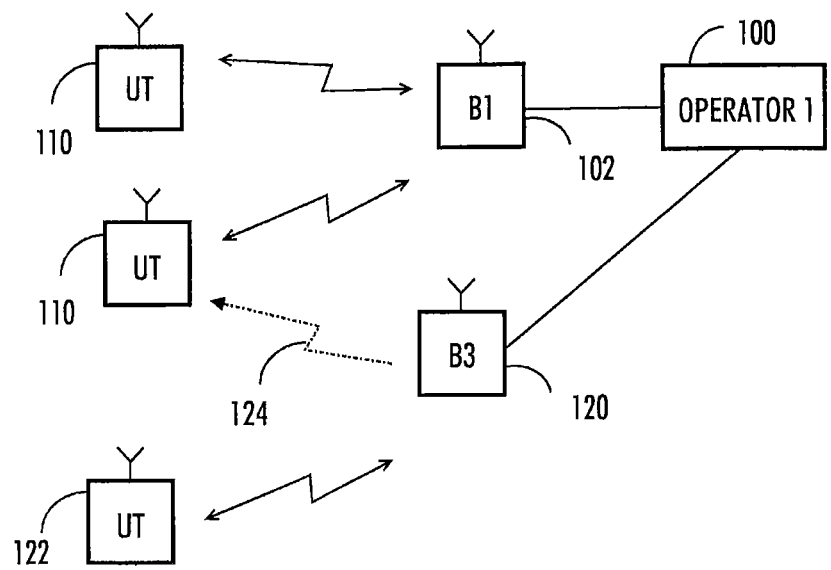

FIGS. 1A and 1B illustrate simplified views of communication environments only showing some elements and functional entities, all being logical units whose implementation may differ from what is shown. The connections shown in FIGS. 1A and 1B are logical connections; the actual physical connections may be different. It is apparent to a person skilled in the art that the systems also comprise other functions and structures. It should be appreciated that the functions, structures, elements and the protocols used in or for communication are irrelevant to the actual invention. Therefore, they need not to be discussed in more detail here.

The FIGS. 1A and 1B illustrate examples of possible origin of interference, particularly out-of-band interference. FIG. 1A shows a situation, where there is a first operator 100 having a network with a base station 102 serving user terminals 104, 106. Nearby there may be a base station 110 of second operator 108 operating using an adjacent frequency band and serving user terminal 112. In this case the operation of the base station 110 may cause out-of-band interference 114 to the network of the first operator 100. This interference is out of the control of the first operator and it may be difficult to identify and mitigate.

FIG. 1B shows a situation, where there is a first operator 100 having a network with a base station 102 serving user terminals 104, 106. On the same area there may be a base station 120 of the same operator but using another access technology and serving different user terminal 122. The operation of the base station 120 may cause out-of-band interference 124 to the user terminals connected to the base station 102. This kind of situation may typically arise during technology migration. For example, the base station 102 may be an LTE network and base station 120 a GSM network, both operating at 900 MHz frequency band. In the case of FIG. 1B, the sites may typically be co-located as the same operator deploys both different technologies. Interference can be managed with some frequency allocated to a guard band and by careful optimization of the network design.

In all cases the first step is to detect the interference so that possible mitigating actions may be taken. Users of communication systems experience interference as degraded communication quality. Degraded downlink quality is experienced by the users as poor service, such as dropped calls or low data throughput. In some systems, user terminals monitor some channels of the systems and may report to the system measured average RSRQ (Reference Signal Received Quality) for the whole bandwidth available to the user terminal (10 MHz in LTE systems, for example). However, any narrowband interference issues may be impossible for user terminals to identify. The capabilities of standard user terminals to detect and identify interference are limited.

It is common practise for operators to employ specific measurements to study the coverage areas and signal strengths of base stations. These measurements are typically performed by a vehicle mounted scanner receiver capable of scanning desired frequency band under study. The scanner performs measurements over the whole desired bandwidth, displays and stores results. The scanner results may reveal poor downlink quality at some point and time during the test. Typically the results are studied and analysed in detail later in a laboratory, where the need for further experiments and measurements is noticed to reveal the cause of the problems in the reception. This kind of operation is slow and cumbersome.

Figure 2:
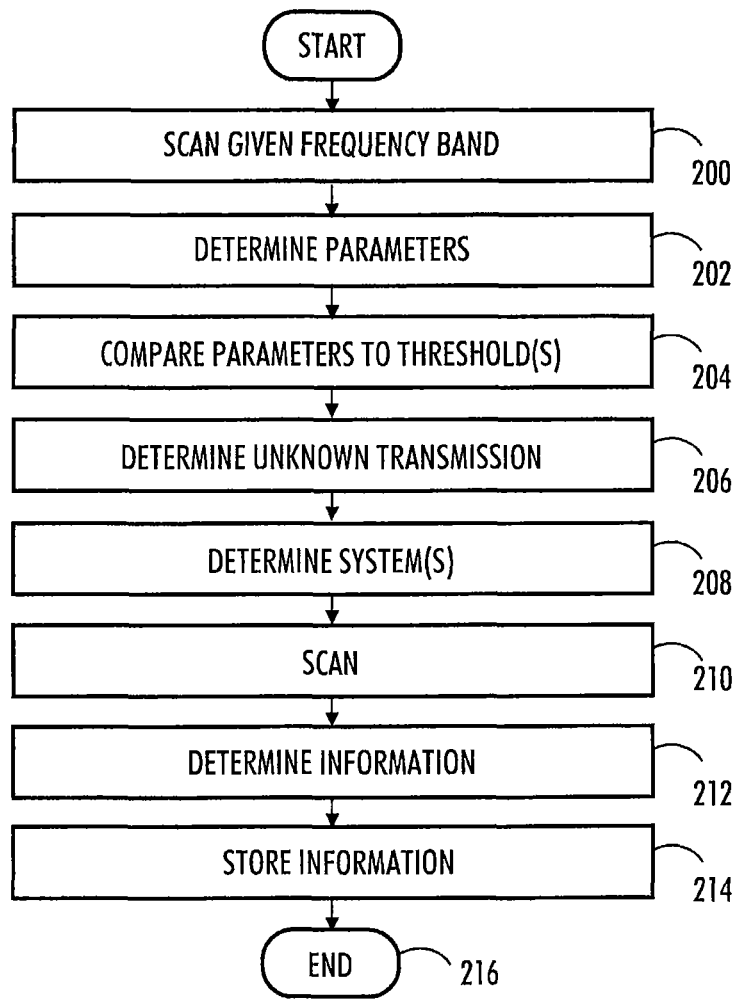
FIG. 2 illustrates an example embodiment of one aspect of the invention.

FIG. 2 illustrates an example embodiment of one aspect of the invention. In this example, a scanner is employed in examining the operation of a communication system utilising a given access method on a given frequency band. Typically a scanner is an apparatus configured to receive and measure transmissions of one or more communications systems one at a time. For example, a scanner may be configured to receive and measure transmissions of UMTS, GSM, LTE, TETRA, EVDO and WLAN, to name a few.

In step 200, the given frequency band is scanned for transmissions of a given transmission system. In this non-limiting example, let us assume that the given transmission system is LTE. In an embodiment, there may be more than one system the scanner is configured to scan.

In step 202, one or more given parameters are determined from the scanning results. Parameters may be related to the received signal quality or received signal strength of the given transmission system. The parameters may depend on the given transmission system. In the example case of LTE, the parameter may be carrier-to-interference plus noise ratio (CINR) per physical resource block (PRB), for example.

In step 204, the at least one determined parameter is compared to a given threshold value.

In step 206, it is determined on the basis of the comparison that an unknown transmission exists on a given frequency band. In the example case of LTE, if CINR falls below a given threshold value, it may be that there is unknown transmission in the used frequency band that is the cause of the degradation in quality of the LTE transmission.

In an embodiment, if a parameter exceeds a given threshold value for a given time period, it is determined that an unknown transmission exists on a given frequency band. The given time period may be a configurable parameter.

In step 208, one or more transmission systems which may be the cause of the unknown transmission are determined. In an embodiment, the determination is based on the frequency band used in the transmission. The scanner may be aware of the systems which are allowed to utilise the given frequency band in transmission. Wireless communication standards which are internationally agreed upon have divided the available frequency spectrum into frequency bands which may be utilised. Many frequency bands are such that more than one system may in principle transmit using the frequency band. The frequency allocation details have been left to local governments to ensure that more than one system do not interfere each other.

In step 210, the scanner is configured to perform a band scan on at least part of the given frequency band for transmissions of the determined one or more transmission system. In this example, the scanner might perform a band scan for transmissions of GSM, CDMA or TETRA systems, for example. In an embodiment, before executing the band scan the start and stop frequencies may be calculated for channels with poor quality. A conversion between the channel numbers or physical resource blocks can be calculated based on a lookup table which may be reprogrammed into the scanner apparatus. The lookup table may also be stored in another apparatus connected to the scanner, such as a computer. In an embodiment, the lookup table may be used with the scanner to convert frequencies to matching cellular system and channel numbers. It may be possible to add systems by defining the system name, start and stop frequencies of both uplink and downlink bands as well as corresponding channel numbers and used bandwidths. In an embodiment, the band scan may be executed for each system supported by the scanner apparatus. All specified channels may be scanned for the selected bands and systems.

In step 212, the scanner is configured to determine on the basis of the scanning the system causing the unknown transmission. In performing the band scan, the scanner may detect transmissions of GSM or CDMA system, for example, and recognise the system. The strongest measured identifiers (CDMA pilot, EVDO pilot, WCDMA scrambling code, LTE Physical Cell ID, for example) for every valid channel of that technology type may be detected. The scanner may further be configured to decode information related to the system and transmission parameters of the unknown transmission. For all detected channels and identifiers per system, the scanner may be configured to execute cell information decoding by reading the system information messages from each system, channel or cell. Signal strength and signal quality may be reported for each identified channel.

In an embodiment, the scanner may be configured to first perform a spectrum analysis over the whole selected frequency band to detect for received signal strength indicator RSSI which is over given threshold value. After that the scanner may be configured to measure only those frequency ranges where it detected RSSI over threshold to make actual band scanning.

In an embodiment, in step 214, the scanner is configured to store information related to the system and the transmission. In addition, the scanner may display the results or transmit the results to another apparatus such as a personal computer.

The embodiment ends at step 216.

In an embodiment, three different categories may be used to present the out-of-band interference source. The signals may be categorised as "detected and measured", "possible or estimated", or "unknown". The first category comprises signals that a transmitted by a system which is determined and recognised by the scanner.

Radio signals that cannot be identified (detected and measured) by the scanner e.g. due to the lacking required option to scan all the cellular systems, but which are inside the known frequency range matching the lookup table may be categorized as a "Possible Interference Source Signal". These signals may be presented in frequency domain with corresponding signal strength peak values measured by the scanner receiver and channel number and direction information corresponding to the lookup table. This may apply also to the uplink channels with all systems. Lookup table may be used to search a matching system, band and channel for the uplink signals.

For example, in case the center frequency of the signal is 925 Mhz, the scanner may populate a list of the systems supporting the corresponding frequency. E.g. in this case the populated list of the systems includes WLAN, DECT and ZigBee etc. The same logic can be used for uplink channels.

In embodiment, in case the scanner is unable to determine the system which is the cause of the unknown transmission, the scanner may be configured to measure one or more parameters from the unknown transmission and store and display the measured parameters. Thus, radio signals that cannot be identified (detected and measured) and that do not match to the lookup table may be categorized as "Unknown Signal". Unknown signals may be presented in frequency domain with corresponding signal strength peak values measured by the scanner.

Thus in an embodiment, the scanner is configured to automatically perform a band scan if poor quality in scanned system transmissions is detected. The proposed solution enables reliable scanning results with minimum delay. Possible problems in reception and quality are detected quickly and the causes of problems are detected without user intervention.

The proposed solution is capable of detecting narrowband interference with broadband systems. For example, interference source coming from a GSM broadcast interfering an LTE system may be detected and identified. Likewise, wideband interference with narrowband systems may be detected. For example, interference source coming from an LTE broadcast interfering GSM system may be detected and identified.

The result of the operation may be a list of detected/possible/unknown out-of-band-interference sources. The interference sources may be visually shown as a list and/or on a map view if cell site information files are available. The category and direction of the interfering signal may be shown, i.e. whether the interfering signal is detected & measured or estimated based on the information in the lookup table. Direction indicates whether the signal is detected and measured downlink signal or possible uplink signal frequency, matching to the certain systems and channels.

In general, the scanner performs interference measurements for each system and channel. The signal-to-interference ratio (S/I or SIR), also known as the carrier-to-interference ratio (C/I, CIR), is the quotient between the average received modulated carrier power S or C and the average received co-channel interference power I, i.e. cross-talk, from other transmitters than the useful signal. The CIR resembles the carrier-to-noise ratio (CNR or C/N), which is the signal-to-noise ratio (SNR or SN) of a modulated signal before demodulation. A distinction is that interfering radio transmitters contributing to I may be controlled by radio resource management, while N involves noise power from other sources, typically additive white Gaussian noise (AWGN).

The CIR ratio is studied in interference limited systems, i.e. where I dominates over N, typically in cellular radio systems and broadcasting systems where frequency channels are reused in view to achieve high level of area coverage. The C/N is studied in noise limited systems. If both situations can occur, the carrier-to-noise-and-interference ratio, C/(N+I) or CNIR may be studied.

As described above in connection with step 204, interference measurements are triggered when poor quality for particular channel(s) is detected by the scanner. The threshold values and possible time period may be a configurable parameter. For example, when C/I has been lower than given dB value for 5 seconds it may trigger out-of-the-band-interference measurements. The parameters may be different for different systems.

With GSM, when the carrier-to-interference ratio (C/I) falls below threshold value, the scanner may be configured to perform a band scan with other systems falling into same frequency range. A Base Station Identity Code (BSIC)

threshold value (dBm) and time (in seconds) that C/I must be below the threshold value may be set.

With CDMA/EVDO systems, when signal-to-interference ratio (SIR) falls below threshold value, the scanner may be configured to perform a band scan with other systems falling into same frequency range. Threshold values for Pilot Ec/I0 (dB) and time (seconds) that SIR must be below the threshold value may be set.

With LTE, when carrier-to-interface-noise ratio (CINR) per physical resource block (PRB) falls below threshold value, the scanner may be configured to perform a band scan with other systems falling into same frequency range. Threshold values for CINR (dB) and time (seconds) that CINR must be below the threshold value may be set.

With TETRA, when the carrier-to-interference ratio (C/I) falls below threshold value, the scanner may be configured to perform a band scan with other systems falling into same frequency range. Threshold values for received signal strength indicator RSSI (dBm) and time (seconds) that C/I must be below the threshold value may be set.

With TD-SCDMA, when signal-to-interference ratio (SIR) falls below threshold value, the scanner may be configured to perform a band scan with other systems falling into same frequency range. Threshold values for Pilot Ec/I0 threshold (dB) and time (seconds) that SIR must be below the threshold value may be set.

With WCDMA, when signal-to-interference ratio (SIR) falls below threshold value, the scanner may be configured to perform a band scan with other systems falling into same frequency range. Threshold values for Pilot Ec/N0 threshold (dB) and time (seconds) that SIR must be below the threshold value may be set.

With WIMAX, when carrier-to-interface-noise ratio (CINR) falls below threshold value, the scanner may be configured to perform a band scan with other systems falling into same frequency range. Threshold values for RSSI and time (seconds) that CINR must be below the threshold value may be set. With WLAN or WiFi, when carrier-to-interface-noise ratio (CINR) falls below threshold value, the scanner may be configured to perform a band scan with other systems falling into same frequency range. Threshold values RSSI and time (seconds) that CINR must be below the threshold value may be set.

In literature related to radio communications, a narrowband transmission describes a channel in which the bandwidth of the message does not significantly exceed the channel's coherence bandwidth. In communications, a system is wideband when the message bandwidth significantly exceeds the coherence bandwidth of the channel. Some communication links have such a high data rate that they are forced to use a wide bandwidth; other links may have relatively low data rates, but deliberately use a wider bandwidth than "necessary" for that data rate in order to gain other advantages.

Figure 3:
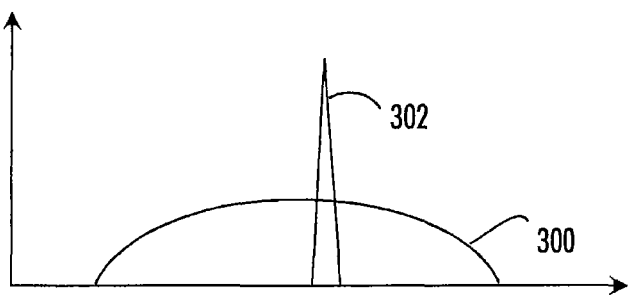
FIG. 3 illustrates narrowband and wideband signals on the same frequency band.

FIG. 3 illustrates narrowband and wideband signals on the same frequency band. There are various spreading methods in common use to create a wideband signal, but the idea behind all of them is to use a bandwidth that may be several orders of magnitude greater than strictly required by the information that is being sent. Because the wideband signal 300 is spread over a large bandwidth, it can coexist with narrow-band signals 302, which generally appear in the spread-spectrum receiver as a slight reduction in the signal-to-noise ratio over the spectrum being used.

Let us study detecting narrowband interference in broadband systems using LTE as an example. In LTE systems, a scanner can measure the carrier-to-interface-noise ratio (CINR) for the whole BW (bandwidth) and per physical resource block (PRB). The transmission bandwidth configuration $N_{RB}$ or the number of PRBs depends on the used channel bandwidth BW [MHz].

TABLE 1

| | Bandwidth BW | | | | | |
|---|---|---|---|---|---|---|
| | 1.4 | 3 | 5 | 10 | 15 | 20 |
| $N_{RB}$ | 6 | 15 | 25 | 50 | 75 | 100 |

Table 1 illustrates the transmission bandwidth configuration (number of PRBs in E-UTRA channel bandwidths. When measuring an LTE carrier with a bandwidth BW of 20 MHz, a scanner may be configured to return carrier-to-interface-noise ratio (CINR) for the whole BW (bandwidth) and per physical resource block (PRB). Total number of CINR/PRB results is 100 with the bandwidth of 20 MHz.

Let us assume that a scanner is about to scan an LTE system having a bandwidth of 10 MHz. The scanner may be given a channel number as an input. In the first phase, the scanner first performs spectrum analysis to detect RSSI above the threshold value. RSSI threshold value may be a configurable parameter.

The LTE carrier center frequency is calculated based on the known channel numbers stored in the scanner. For example, if the channel number is 900, the corresponding center frequency is 1960 MHz. The used bandwidth BW is automatically detected by the scanner as it decodes the information from Master Information Block MIB signaling messages. Based on the known center frequency and the BW (10 MHz) information the start and stop frequencies can be calculated. Start frequency is 1955 MHz and stop frequency is 1965 MHz.

Figure 4:
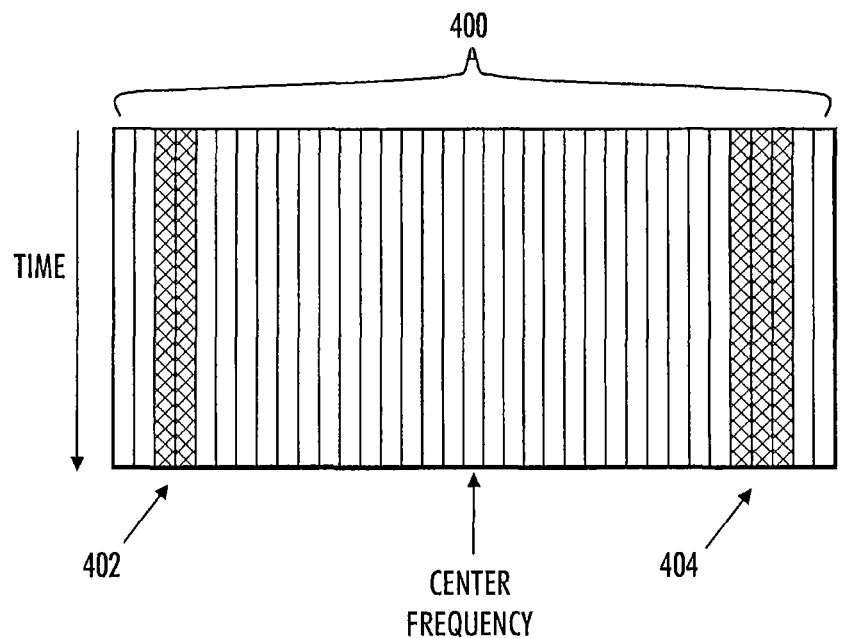
FIG. 4 illustrates LTE channel bandwidth.

FIG. 4 illustrates LTE channel bandwidth with some poor CINR/PRB results. The figure shows frequency on the x-axis and time on the y-axis. The figure illustrates measurement results in a so-called waterfall format. The examined bandwidth comprises 50 PRBs 400. The measurement results indicate that there are some PRBs 402, 404 having a low quality. These PRBs are marked with hatching in FIG. 4. The bandwidth of each physical resource block is 180 kHz. Based on this information the center frequencies of the physical resource blocks 402, 404 reporting poor CINR values can be calculated.

In the second phase the scanner is configured to start band scan tasks for the PRBs detected with the first phase. There may be any number of PRBs or groups of PRBs to be scanned. In this example, the start and stop frequencies of the PRBs 402, 404 are known and band scan can be executed for two frequency sets 402, 404. The scanner may perform further analysis and identification.

Let us next study detecting broadband Interference with narrowband systems.

The procedure to detect the broadband interference with the narrowband system is similar as the procedure described above. Based on the cellular system, band and bandwidth information, the center frequency, as well as the start and stop frequencies of the channel with poor downlink quality may be determined. By searching a lookup table stored in the scanner, other cellular systems falling to the same frequency range may be determined. For each channel the start, center and stop frequencies and used bandwidths are determined. Based on this information, systems and channels to be used with the band scan can be selected. The band scan is executed accordingly.

For example, let us assume that in a GSM 1900 channel having absolute radio-frequency channel number (ARFCN) 661 a low C/I value is detected. The center frequency of this channel is 1960 MHz. Bandwidth is 200 kHz. The scanner is configured to perform a band scan using the same frequency range for all systems. The band scan detects all systems in the same frequency range and creates a list of the systems, channels and cells. In this example the detected/possible broadband (LTE) interfering source may be channel 900, E-UTRA band 2, 1960 MHz with bandwidth of 10 MHz.

Let us study the operation of the scanner when detecting different systems.

When the scanner has detected GSM broadcast in band scan, it decodes cell specific information from the broadcast control channel for each GSM downlink channel falling into the band scan frequency range. List of the uplink channels matching to the frequency range may be populated based on a lookup table. Parameters stored for each detected GSM transmission may comprise center frequency, direction (up- or downlink), detection type (detected/possible/unknown), RSSI (peak RSSI level, for uplink only), ARFCN, band, BSIC, mobile country code MCC, mobile network code MNC, location area code LAC, Cell ID (cell identification), RX level (Received signal strength, downlink only) and Channel C/I.

Based on the above parameters the particular interfering cell can be identified for certain operator. Operator name can be stored and shown in the interface of the scanner along with the parameters. If information of base stations and their locations is available, interfering GSM cell may be shown on the map view and distance to the interfering cell may be shown.

When the scanner has detected a CDMA/EVDO broadcast in band scan it decodes the cell specific information from the control channel for each CDMA/EVDO downlink channel falling into the bans scan frequency range. List of the uplink channels matching to the frequency range are populated based on a lookup table. Parameters stored for each detected CDMA/EVDO transmission may comprise center frequency, direction (up- or downlink), detection type (detected/possible/unknown), RSSI (peak RSSI level, for uplink only), channel number, band, pilot number PN, system ID SID, network ID NID, mobile network code MNC, carrier RSSI level (received signal strength), received energy per chip Ec/Io, received signal code power RSCP and SIR. Operator name can be stored and shown in the interface of the scanner along with the parameters. If information of base stations and their locations is available, interfering CDMA/EVDO cell may be shown on the map view and distance to the interfering cell may be shown.

It is also possible that interfering source is coming from the same LTE carrier, for example in border areas of different countries. When the scanner has detected an LTE broadcast in the band scan it decodes the cell specific information from the control channel for each LTE downlink channel falling into the band scan frequency range. As bandwidth of the LTE broadcast can be between 1.4 MHz to 20 MHz the actual start and stop frequencies are extended accordingly. This information can be found in a lookup table stored in the scanner. A list of the uplink channels matching to the frequency range may be populated based on the lookup table as well.

Parameters stored for each detected LTE transmission may comprise center frequency, bandwidth BW of the carrier, direction (up- or downlink), detection type (detected/possible), RSSI (peak RSSI level, for uplink only), EARFCN (channel number), band, PCI (physical cell identity), mobile country code MCC, mobile network code MNC, tracking area code TAC, Cell ID (cell identification), E-UTRAN Cell Global Identifier ECGI, carrier RSSI level (Received field strength of the channel), RSRQ (received energy per chip), RSRP (received signal code power) and CINR.

Based on the above parameters the particular interfering LTE cell can be identified for certain operator. Operator name can be stored and shown in the interface of the scanner along with the parameters. If information of base stations and their locations is available, interfering cell may be shown on the map view and distance to the interfering cell may be shown.

When the scanner has detected a TETRA broadcast in band scan it decodes the cell specific information from the control channel for each TETRA downlink channel falling into the bans scan frequency range. List of the uplink channels matching to the frequency range are populated based on a lookup table.

Parameters stored for each detected TETRA transmission may comprise center frequency, direction (up- or downlink), detection type (detected/possible), RSSI (peak RSSI level, for uplink only), ARFCN (channel number), band, color code CC, mobile country code MCC, mobile network code MNC, RX level (Received field strength of the channel), and Channel C&I.

Based on the above parameters the particular interfering cell can be identified for certain operator. Operator name can be stored and shown in the interface of the scanner along with the parameters. If information of base stations and their locations is available, interfering TETRA cell may be shown on the map view and distance to the interfering cell may be shown.

When the scanner has detected a TD/SCDMA broadcast in band scan it decodes the cell specific information from the control channel for each TD/SCDMA downlink channel falling into the bans scan frequency range. List of the uplink channels matching to the frequency range are populated based on a lookup table.

Parameters stored for each detected TD/SCDMA transmission may comprise center frequency, direction (up-or downlink), detection type (detected/possible), RSSI, channel number, cell parameter ID, the received energy per chip divided by relevant measured power density in the wide band Ec/I0, RSCP (received signal code power of a single code) and SIR.

When the scanner has detected a WCDMA broadcast in band scan it decodes the cell specific information from the control channel for each WCDMA downlink channel falling into the bans scan frequency range. List of the uplink channels matching to the frequency range are populated based on a lookup table.

Parameters stored for each detected WCDMA transmission may comprise center frequency, direction (up- or downlink), detection type (detected/possible), RSSI (uplink only), UARFCN (channel number), scrambling code number, Cell identification, CGI (Cell Global Identity), band, local area code LAC, mobile network code MNC, carrier RSSI level, and SIR.

Based on the above parameters the particular interfering cell can be identified for certain operator. Operator name can be stored and shown in the interface of the scanner along with the parameters. If information of base stations and their locations is available, interfering WCDMA cell may be shown on the map view and distance to the interfering cell may be shown.

When the scanner has detected a WIMAX broadcast in band scan it decodes the cell specific information from the control channel for each WIMAX downlink channel falling into the bans scan frequency range. List of the uplink channels matching to the frequency range are populated based on a lookup table.

Parameters stored for each detected WIMAX transmission may comprise center frequency, direction (up- or downlink), detection type (detected/possible), RSSI (uplink only), WIMAX preamble index, WIMAX base station ID, bandwidth, local area code LAC, mobile network code MNC, Preamble RSSI and WIMAX CINR.

Based on the above parameters the particular interfering cell can be identified for certain operator. Operator name can be stored and shown in the interface of the scanner along with the parameters. If information of base stations and their locations is available, interfering WIMAX cell may be shown on the map view and distance to the interfering cell may be shown.

When the scanner has detected a WLAN/WiFi in band scan it decodes the cell specific information from the broadcast for each WLAN/WiFi downlink channel falling into the bans scan frequency range.

Parameters stored for each detected WLAN/WiFi transmission may comprise center frequency, direction (up- or downlink), detection type (detected/possible), band, channel number, quality, RSSI (uplink only), SSID (LAN service set identifier), BS ID (base station identifier), MAC add, (MAC address), security mode and IP address of the network.

Figure 5:
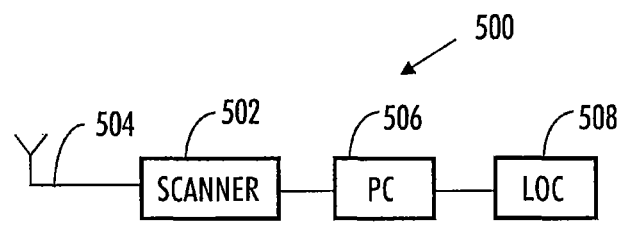
FIG. 5 illustrates an example of an apparatus arrangement.

FIG. 5 illustrates an example of an arrangement 500 in which some embodiments of the invention may be used. In an embodiment, the arrangement 500 is mounted to a moving vehicle. The example arrangement comprises a scanner apparatus 502, which is configured to scan and measure frequency bands for transmissions of one or more transmission systems. The scanner is connected to an antenna arrangement 504 that may comprise one or more antennas. The scanner may receive operating power from the vehicle or it may comprise a battery.

The arrangement may further comprise a computing device 506 which typically may be realised with a personal computer. The computing device may be configured to be in connection with the scanner apparatus 502. The connection may be realised with an USB (universal serial bus) connection, Ethernet connection, or any other type of wired or wireless connection as in clear to one skilled in the art. The computing device may be configured to control the scanner. The computing device may give commands to the scanner and read and store data or measurement or scan results obtained by the scanner. Furthermore, the computing device may store lookup tables mentioned earlier as a backup or replacement of scanner storage. The computing device may receive operating power from the vehicle or it may comprise a battery.

The arrangement may further comprise a location unit 508. The location unit may keep track of the location of the arrangement. The location may be tracked using a satellite positioning system, such as GPS (Global Positioning System) or Glonass, for example. The location unit 508 may be connected to the a computing device 506. The unit may also be connected to the scanner or be intergraded in either the computing device or the scanner.

Figure 6:
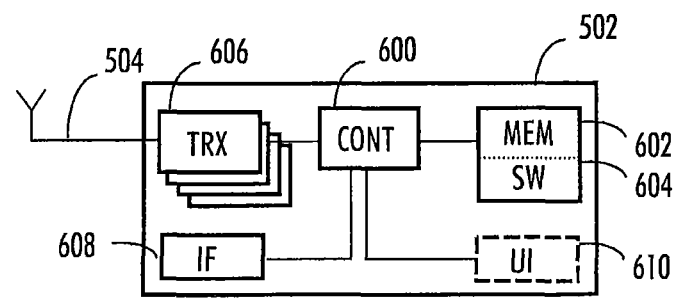
FIG. 6 illustrates an example of an apparatus of an embodiment.

FIG. 6 illustrates an example of an apparatus of an embodiment. The figure illustrates a simplified example of the structure of the scanner apparatus 502 of FIG. 5.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 600 configured to control at least part of the operation of the apparatus.

The apparatus may comprise a memory 602 for storing data. Furthermore the memory may store software 604 executable by the control circuitry 600. The memory may be integrated in the control circuitry.

The apparatus comprises a set 606 of transceivers. The transceiver set 606 is operationally connected to the control circuitry 600. It is connected to an antenna arrangement 504 that may comprise one or more antennas. The set of transceivers may comprise one or more transceivers configured to communicate with different communication systems, such as UMTS, GSM, LTE, LTE-A, TETRA, EVDO, WLAN (WiFi), to name a few.

In an embodiment, the scanner apparatus has a modular structure where the transceivers belonging to the set of transceivers may be modular units which may be easily installed and removed according to need. In an embodiment, transceivers may be realised with a software defined radio unit or units.

The software 604 may comprise a computer program comprising program code means adapted to cause the control circuitry 600 of the apparatus to control the set 606 of transceivers to scan a given frequency band for transmissions of a given transmission system; determine one or more given parameters from the obtained scanning results; compare at least one determined parameter to a given threshold value; determine on the basis of the comparison that an unknown transmission exists on a given frequency band; determine one or more transmission systems which may be the cause of the unknown transmission; scan at least part of the given frequency band for transmissions of the determined one or more transmission system; and determine on the basis of the scanning the system causing the unknown transmission and decoding information related to the system and transmission parameters of the unknown transmission, for example.

The apparatus may further comprise interface circuitry 608 configured to connect the apparatus to other devices, such as the computing unit 506 of FIG. 5. The interface may provide a wired or wireless connection with other devices.

The apparatus may further comprise user interface 610 operationally connected to the control circuitry 600. The user interface may comprise a display, a keyboard or keypad, and a speaker, for example.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, which may comprise a working memory (RAM), a central processing unit (CPU), and a system clock. The CPU may comprise a set of registers, an arithmetic logic unit, and a controller. The controller is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

I claim:

1. An apparatus, comprising:
at least one processor; and
at least one memory including a computer program, executable by the at least one processor,
wherein the at least one memory and the computer program, with the at least one processor, are configured to cause the apparatus to:
scan a given frequency band for transmissions of a given transmission system;
determine one or more given parameters from results of the scan;
compare at least one determined parameter to a given threshold value;
determine based on the comparison that an unknown transmission exists on the given frequency band;
determine one or more transmission systems which may cause the unknown transmission;
scan at least part of the given frequency band for transmissions of the determined one or more transmission systems; and
determine, based on the scan of the at least part of the given frequency band, a transmission system of the one or more transmission systems causing the unknown transmission and decoding information related to the transmission system and transmission parameters of the unknown transmission.

2. The apparatus according to claim 1, wherein the at least one memory and the computer program, with the at least one processor, are further configured to cause the apparatus to determine the frequency of the unknown transmission.

3. The apparatus according to claim 1, wherein the at least one memory and the computer program, with the at least one processor, are further configured to cause the apparatus to store information related to the transmission system and the transmission parameters.

4. The apparatus according to claim 2, wherein the at least one memory and the computer program, with the at least one processor, are further configured to cause the apparatus to determine the one or more transmission systems which may cause the unknown transmission based on the frequency of the unknown transmission.

5. The apparatus according to claim 1, wherein the at least one memory and the computer program, with the at least one processor, are further configured to cause the apparatus to scan at least part of the given frequency band for transmissions in turn using the determined transmission parameters.

6. The apparatus according to claim 1, wherein the at least one memory and the computer program, with the at least one processor, are further configured to cause the apparatus to select start and stop frequencies for the frequency band to be scanned and scanning the selected frequency band for transmissions of one more determined one or more transmission systems.

7. The apparatus according to claim 1, wherein the at least one memory and the computer program, with the at least one processor, are further configured to cause the apparatus to read system information messages from the unknown transmission of the one or more transmission systems causing the unknown transmission.

8. The apparatus according to claim 1, wherein the at least one memory and the computer program, with the at least one processor, are further configured to measure one or more parameters from the unknown transmission if the one or more transmission systems causing the unknown transmission cannot be determined and storing the measured parameters.

9. The apparatus according to claim 1, wherein the given parameters comprise a signal quality of a received signal or a signal level of a received signal.

10. The apparatus according to claim 1, wherein the at least one memory and the computer program, with the at least one processor, are further configured to determine that an unknown transmission exists on the given frequency band if the at least one determined parameter exceeds the given threshold value for a given time period.

11. A method, comprising:
scanning a given frequency band for transmissions of a given transmission system;
determining one or more parameters from results of the scanning;
comparing at least one determined parameter of the one or more parameters to a given threshold value;
determining based on the comparison that an unknown transmission exists on the given frequency band;
determining one or more transmission systems which may cause the unknown transmission;
scanning at least part of the given frequency band for transmissions of the determined one or more transmission systems; and
determining, based on the scanning of the at least part of the given frequency band, a transmission system of the one or more transmission systems causing the unknown transmission and decoding information related to the transmission system and transmission parameters of the unknown transmission.

12. A method according to claim 11, further comprising:
determining that an unknown transmission exists on the given frequency band if the at least one determined parameter exceeds the given threshold value for a given time period.

13. The method according to claim 11, further comprising:
storing information related to the transmission system and the transmission parameters.

14. The method according to claim 11, wherein determining the one or more transmission systems which may cause the unknown transmission is based on frequency of the unknown transmission.

15. The method according to claim 11, further comprising:
scanning at least part of the given frequency band for transmissions in turn using the determined transmission parameters.

16. The method according to claim 11, wherein the one or more parameters comprise a signal quality of a received signal or a signal level of a received signal.

17. The method according to claim 11, further comprising:
measuring one or more parameters from the unknown transmission if the transmission system causing the unknown transmission cannot be determined and storing the measured parameters.

* * * * *